(12) United States Patent
Liu et al.

(10) Patent No.: US 8,904,626 B2
(45) Date of Patent: Dec. 9, 2014

(54) METHOD OF MAKING AN ELECTRODE

(75) Inventors: Jianyun Liu, Shanghai (CN); Wei Cai, Shanghai (CN); Hai Yang, Shanghai (CN); Liping Zheng, Shanghai (CN); Rihua Xiong, Shanghai (CN)

(73) Assignee: General Electric Company, Schenectady, NY (US)

( * ) Notice: Subject to any disclaimer, the term of this patent is extended or adjusted under 35 U.S.C. 154(b) by 335 days.

(21) Appl. No.: 13/121,293

(22) PCT Filed: Aug. 10, 2009

(86) PCT No.: PCT/IB2009/006723
§ 371 (c)(1),
(2), (4) Date: Mar. 28, 2011

(87) PCT Pub. No.: WO2010/035092
PCT Pub. Date: Apr. 1, 2010

(65) Prior Publication Data
US 2011/0175252 A1 Jul. 21, 2011

(30) Foreign Application Priority Data

Sep. 26, 2008 (CN) .......................... 2008 1 0161788

(51) Int. Cl.
| | | |
|---|---|---|
| H01S 4/00 | (2006.01) | |
| H01M 4/96 | (2006.01) | |
| H01M 4/86 | (2006.01) | |
| C08J 3/205 | (2006.01) | |
| H01M 4/88 | (2006.01) | |

(52) U.S. Cl.
CPC ................ *C08J 3/2053* (2013.01); *H01M 4/96* (2013.01); *Y02E 60/50* (2013.01); *C08J 2327/18* (2013.01); *H01M 4/8668* (2013.01); *H01M 4/8875* (2013.01)

USPC ...... 29/592.1; 29/602.1; 29/603.07; 252/511; 428/221; 524/495; 524/496; 524/546

(58) Field of Classification Search
USPC ............ 29/603.07, 603.12, 603.17, 605, 737, 29/739, 760; 252/511; 264/49, 108, 120, 264/122, 127, 175, 349; 428/221; 524/495, 524/496, 546
See application file for complete search history.

(56) References Cited

U.S. PATENT DOCUMENTS 4,129,470 A * 12/1978 Homsy .......................... 156/155
4,153,661 A 5/1979 Ree et al.

(Continued)

FOREIGN PATENT DOCUMENTS

| CN | 1625792 A | 6/2005 |
|---|---|---|
| JP | 62223255 A | 10/1987 |

(Continued)

OTHER PUBLICATIONS

Desalination, Development of a carbon sheet electrode for electrosorption desalination, Park, Kwang-Kyu; Lee, Jae-Bong; Park, Pill-Yang; Yoon, Seok-Won; Moon, Jeon-Soo; Eum, Hee-Moon; Lee, Chi-Woo, v 206, No. 1-3, Feb 5, 2007, p. 86-91. ISSN: 0011-9164.

(Continued)

*Primary Examiner* — Paul D Kim
(74) *Attorney, Agent, or Firm* — GE Global Patent Operation

(57) ABSTRACT

Methods for preparing an electrode comprise: providing a mixture of carbon particles and a solvent and shearing the mixture to form a dispersion of the carbon particles in the solvent; adding non-fibrillated POLY(TETRAFLUOROETHYLENE) to the dispersion to provide a resultant mixture and shearing the resultant mixture until at least a portion of the poly(tetrafluoroethylene) has been fibrillated; processing the resultant mixture into a sheet; and attaching the sheet onto a current collector. Methods for preparing sheet for the electrode and composition for the sheet are also provided.

11 Claims, 4 Drawing Sheets

(56) References Cited

U.S. PATENT DOCUMENTS

| | | | |
|---|---|---|---|
| 4,379,772 A * | 4/1983 | Solomon et al. | 264/49 |
| 6,127,474 A | 10/2000 | Andelman | |
| 6,183,668 B1 * | 2/2001 | Debe et al. | 252/510 |
| 6,264,707 B1 * | 7/2001 | Ishikawa et al. | 29/25.03 |
| 6,356,432 B1 | 3/2002 | Daniel et al. | |
| 6,630,081 B1 | 10/2003 | Furuya | |
| 6,818,339 B1 * | 11/2004 | Sugawara et al. | 429/492 |
| 7,029,785 B2 * | 4/2006 | Hatoh et al. | 429/480 |
| 7,175,783 B2 | 2/2007 | Curran | |
| 7,285,615 B2 * | 10/2007 | Adachi et al. | 526/319 |
| 7,329,353 B2 * | 2/2008 | Dillon et al. | 210/635 |
| 7,491,352 B2 | 2/2009 | Ito | |
| 7,544,630 B2 * | 6/2009 | Hatoh et al. | 502/101 |
| 2002/0061956 A1 | 5/2002 | Kobayashi et al. | |
| 2003/0143454 A1 * | 7/2003 | Hatoh et al. | 429/44 |
| 2004/0086774 A1 | 5/2004 | Munoz et al. | |
| 2005/0288177 A1 * | 12/2005 | Hatoh et al. | 502/101 |
| 2007/0075300 A1 | 4/2007 | Curran et al. | |
| 2007/0201184 A1 | 8/2007 | Plec et al. | |
| 2008/0028583 A1 | 2/2008 | Shimoyanna et al. | |
| 2010/0119945 A1 * | 5/2010 | Akagi et al. | 429/231.8 |
| 2011/0024287 A1 * | 2/2011 | Zheng et al. | 204/242 |

FOREIGN PATENT DOCUMENTS

| | | |
|---|---|---|
| JP | 07252365 A | 10/1995 |
| JP | 2001006699 A | 1/2001 |
| JP | 2001011679 A | 1/2001 |
| JP | 2003342436 A | 12/2003 |
| JP | 2006314388 A | 11/2006 |
| WO | 2002/061956 A1 | 8/2002 |
| WO | 2005/049700 A1 | 6/2005 |
| WO | 2007/007530 A1 | 1/2007 |

OTHER PUBLICATIONS

Meeting Abstracts, Meeting Abstracts—205th Meeting of The Electrochemical Society, A study of screen-printing processing conditions in making membrane electrode assemblies for PEM fuel cells,,Zaffou, R.; Mittal, V.; Kunz, H.R.; Fenton, J.M. Zaffou, R.; Mittal, V.; Kunz, H.R.; Fenton, J.M.,ISSN: 1091-8213,Year, 2004, p. 310.

International Search Report and Written Opinion from corresponding PCT International Application No. PCT/IB2009/006723, dated Jul. 12, 2009.

Office Action Issued in JP Application 2011-528438 dated Mar. 19, 2013.

Chinese office action issued in connection with CN Patent Application No. 200810161788.9 dated Feb. 24, 2011.

* cited by examiner

METHOD OF MAKING AN ELECTRODE

BACKGROUND

This disclosure relates generally to electrodes and, more specifically, to methods for preparing composition, sheet comprising the composition, and electrode comprising the sheet and used in electrochemical device such as supercapacitor, fuel cell and supercapacitor desalination.

Supercapacitors are energy storage devices having high capacitance per unit mass (of the order of several tens of farads per gram (F/g) of active material to about 100 F/g of active material) and high instantaneous specific power. Supercapacitor electrosorption deionization is proposed recently as a new desalination technology to lower water treatment cost and prevent environmental pollution.

A supercapacitor comprises two identical electrodes, an electrolyte, and a separator sandwiched by the electrodes and permeable to ions of the electrolyte. Supercapacitors are categorized into different types depending on the structure of the electrodes and the nature of the electrolytes. One type of supercapacitors has an organic electrolyte and activated carbon electrodes with a large specific surface area lying in the range 1000 $m^2$/g to 3000 $m^2$/g, and operates electrostatically.

The activated carbon electrodes of a supercapacitor are obtained by depositing a paste sheet on a current collector. The paste is a mixture of an active carbon, a solvent, and a binder. Polytetrafluoroethylene (PTFE) is commonly used as the electrode binder.

In preparing the paste sheet, PTFE, carbon and solvents are mixed under high shear and high temperature, biaxially calendered at high temperature, extruded into the final form at high temperature, and dried at high temperature to remove the solvents. High temperatures, especially those approaching the boiling point of water, cause water lost quickly. As water is lost, the viscosity of the material rises in an uncontrolled manner, the rate of fibrillation of PTFE increases quickly, and it is very difficult to fibrillate the PTFE to a consistent level. Drying also causes water that had been incorporated into the very small pores within and around the carbon particles to be removed as vapor. It usually takes an extremely long time to rewet the carbon PTFE material and some of the originally wet internal pores of the carbon PTFE material even cannot get rewetted again.

It has been proposed to run this operation at room temperature, low shear rate and without drying. However, this method mixes all materials in one step (one-step method) and induces non-uniform mixing of PTFE and poor fibrillation of PTFE, resulting in poor electrode sheet. Furthermore, this method usually takes a relatively long time.

A need therefore exists for improved methods for preparing composition, sheet comprising the composition and electrode comprising the sheet.

SUMMARY

In one aspect, a method of preparing a composition comprises: providing a mixture of carbon particles and a solvent and shearing the mixture to form a dispersion of the carbon particles in the solvent; and adding non-fibrillated POLY(TETRAFLUOROETHYLENE) to the dispersion to provide a resultant mixture and shearing the resultant mixture until at least a portion of the poly(tetrafluoroethylene) has been fibrillated.

In another aspect, a method for preparing a sheet comprises: providing a mixture of carbon particles and a solvent and shearing the mixture to form a dispersion of the carbon particles in the solvent; adding non-fibrillated POLY(TETRAFLUOROETHYLENE) to the dispersion to provide a resultant mixture and shearing the resultant mixture until at least a portion of the poly(tetrafluoroethylene) has been fibrillated; and processing the resultant mixture into a sheet.

In yet another aspect, a method for preparing an electrode comprises: providing a mixture of carbon particles and a solvent and shearing the mixture to form a dispersion of the carbon particles in the solvent; adding non-fibrillated POLY(TETRAFLUOROETHYLENE) to the dispersion to provide a resultant mixture and shearing the resultant mixture until at least a portion of the poly(tetrafluoroethylene) has been fibrillated; processing the resultant mixture into a sheet; and attaching the sheet onto a current collector.

BRIEF DESCRIPTION OF THE DRAWINGS

Referring now to the Figures, which are exemplary embodiments, and wherein the like elements are numbered alike.

DETAILED DESCRIPTION

Figure 1:
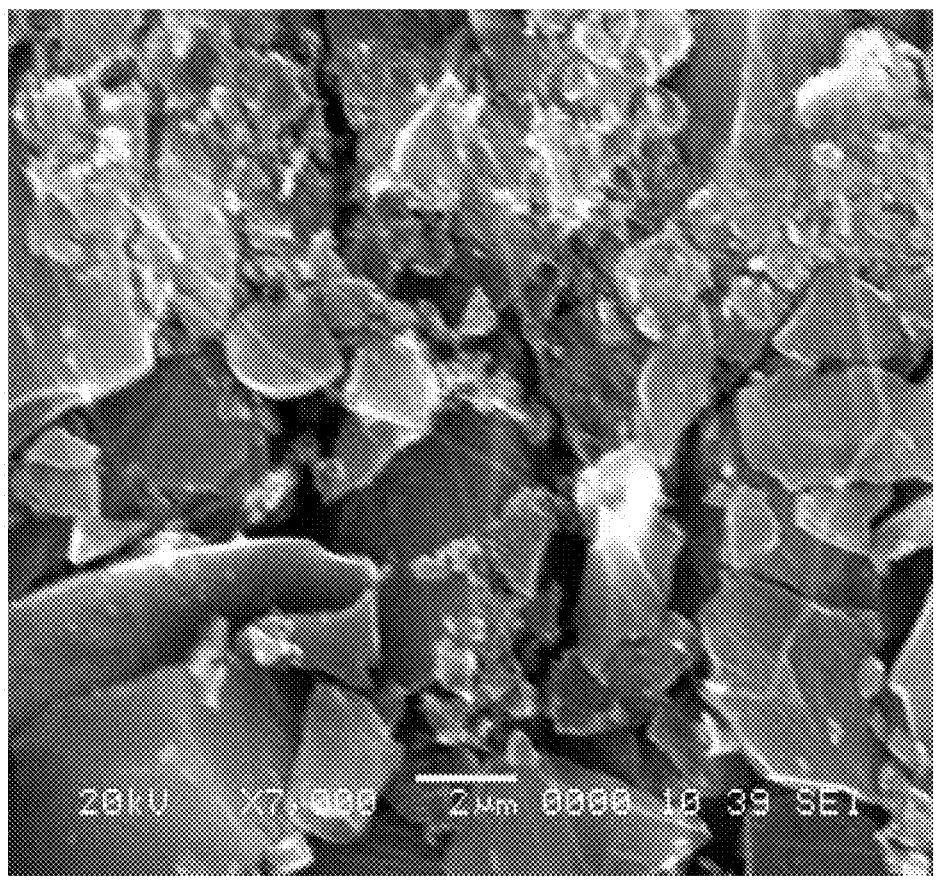
FIG. 1 is a scanning electron micrograph image of a composition prepared in example 1.

Methods for preparing composition, sheet comprising the composition and electrode comprising the sheet are described herein. The electrode may be used in electrochemical device such as supercapacitor, fuel cell and supercapacitor desalination.

The composition is prepared by: providing a mixture of carbon particles and a solvent and shearing the mixture to form a dispersion of the carbon particles in the solvent; and adding non-fibrillated POLY(TETRAFLUOROETHYLENE) to the dispersion to provide a resultant mixture and shearing the resultant mixture until at least a portion of the poly(tetrafluoroethylene) has been fibrillated (two-step method). After calendaring, printing, and/or extruding, the resultant mixture is processed into a sheet. Trimming the sheet into desired sizes and shapes and pressing it onto a current collector, an electrode is formed.

Dry the resultant mixture in an oven at 100° C., and press (5 MPa) it into a small piece. Cut the sheet into small pieces. The small pieces can be used for scanning electron micrograph characterization.

The solvent may be water, ethanol, or any other suitable solvents. Conducting material may be included in the mixture so that the composition comprises: 2-10% by dry weight of POLY(TETRAFLUOROETHYLENE); 0-30% by dry weight of conducting material; and 60-98% by dry weight of carbon particles. The conducting material may be a strongly acidic cation ion exchange resin, a strongly basic anion ion exchange resin, carbon black, graphite powder, and so on. The non-fibrillated POLY(TETRAFLUOROETHYLENE) is added portionwise. It should be noted that ion exchange resin significantly improves the performance of the electrode by increasing the capacity, e.g., 37% and/or decreasing resistance, e.g., 21%. A ratio by weight between the water and total of the fibrillatable PTFE, conducting material and the carbon particles may be 3:2 to 4:1. The amount of solvent affects the ways in which the composition is processed into a sheet. Less solvent used, the composition should be calendered into sheet. More solvent used, the resultant mixture may be directly printed on the current collector.

The shearing is applied using a type of speedmixer (e.g. Speedmixer™ DAC (Dual Asymmetric Centrifuge) 150 FVZ, Siemens) based on double rotations of a mixing arm thereof and a basket thereof inside the mixing arm. The mixing arm of the DAC 150 FVZ rotates with a speed of up to 3500 rpm in a direction. The basket rotates in an opposite direction with a speed of approx. 900 rpm. The combination of the different centrifugal forces which act in different directions enables the fast mixing process. A rate of shearing used in this application is 400-3500 rpm (rotation of the mixing arm).

Viscosity analysis is a powerful tool to investigate physical properties of PTFE in the mixture. Viscosity analysis indicates that PTFE enhances the viscosity during the mixing process attributed to the fibrillation of PFTE and that the viscosity depends on the shear rate and the shear time, so does the fibrillation degree. The viscosity decreases with time because the longer time shearing will break the fiber, so does the too high shearing rate. Therefore, shorter shearing time is enough for fibrillation at high shearing rate. Thus, the preparing process is operated at room temperature in 0.5 to 10 minutes.

Tensile strength of sheets was tested by SANS CMT5105 electromechanical universal testing machine using dumbbell-shape sample with 4 mm width, 1 mm thickness.

As used herein, the terms "a" and "an" do not denote a limitation of quantity, but rather denote the presence of at least one of the referenced items. Moreover, the endpoints of all ranges directed to the same component or property are inclusive of the endpoint and independently combinable (e.g., "up to about 25 wt. %, or, more specifically, about 5 wt. % to about 20 wt. %," is inclusive of the endpoints and all intermediate values of the ranges of "about 5 wt. % to about 25 wt. %," etc.). Reference throughout the specification to "one embodiment", "another embodiment", "an embodiment", and so forth means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Unless defined otherwise, technical and scientific terms used herein have the same meaning as is commonly understood by one of skill in the art to which this invention belongs.

EXAMPLES

Next, the present invention is described specifically with reference to Examples and Comparative Examples.

Example 1

Activated carbon (12 g, manufactured by Yuhuan activated carbon Co. Ltd., coconut shell type, average particle size of 15 microns, surface area of 2000 $m^2/g$) and 38 g of water were added into a speedmixer. Mix at room temperature with 1000 rpm speed for 30 seconds.

Then 0.6 g PTFE (T-60 emulsion, Dupont) was dropped into the above mixture and mixed at 1000 rpm for 30 seconds. Another 0.6 g PTFE was dropped into the mixture and mixed at 1000 rpm for 30 seconds. Then the resultant mixture was formed as a paste with some water seeped out from the mixture. The paste can be used directly for calendering without any drying step.

FIG. 1 is the scanning electron micrograph (SEM) image of the paste. From the image, the fiber was found clearly near the carbon particles. This confirmed that fibrillation of PTFE happened during mixing process.

Figure 2:
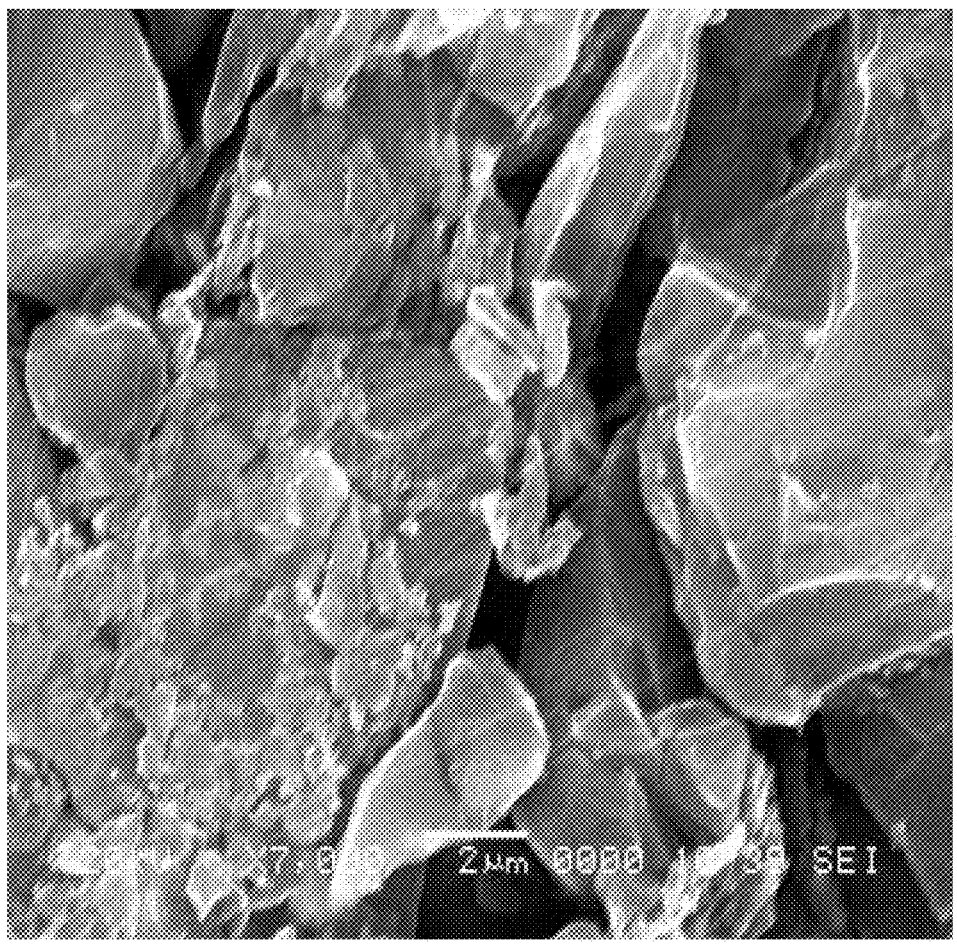
FIG. 2 is a scanning electron micrograph image of a sheet prepared in example 1.

For roll calendering, a two-roll calender was used. The calender nip was set to 0.8 mm width, the mixed paste was put through the nip, and then a thin sheet was formed. Folding the sheet in third, and reinserted it into the nip of the calender. This process was repeated for 5 times with 90° rolling direction changes every time. Finally the uniform carbon composite thin sheet was ready with ~1 mm thickness. FIG. 2 shows the SEM picture of the carbon sheet prepared by this method. It is very clear that the carbon particles were surrounded by the PTFE fiber. These fibers were extended in some directions comparing to the disorder of the paste before calendering. The ordered fiber extension is due to the calendering process. The tensile strength of the resulting sheet is 0.14 MPa.

Finally, the sheet was trimmed into 4 cm×10 cm rectangles for use in the electrode assembly. Put one rectangle on a Ti mesh current collector. After pressing (8 MPa), a capacitor electrode with 40 $cm^2$ surface area was formed. Two electrodes each with 3 g activated carbon loading amount and 2 stacked spacers (1.0 mm thickness) were assembled together to form a cell used for supercapacitor desalination. Between the electrodes is a 1560 ppm NaCl solution. The cell resistance was 2.4+1-0.07 Ohm. The cell capacity was measured by scanning cyclic voltammetry in 1 mol/L NaCl solution as 75.6+/−0.7 F/g.

Example 2

Activated carbon (6 g, manufactured by Yuhuan activated carbon Co. Ltd., coconut shell type, average particle size of 15 microns, surface area of 2000 $m^2/g$), 2.1 g anion ionic exchange resin (Tianjin Nankai Resin Factory, Strongly basic anion exchanger 201×7, milled into ~50 μm particle size before use, water content 40%), and 20 g of water were added into a speedmixer. Mix at room temperature with 1000 rpm speed for 30 seconds.

To the upper mixture, total 0.8 g PTFE (T-60 emulsion, Dupont) was added. 0.2 g PTFE was dropped into the mixture by each time, with mixing at 3500 rpm for 20 seconds until complete. The paste is put directly on the roller for calendering.

For roll calendering, a two-roll calender was used. The calender nip was set to 0.8 mm width, the mixed paste is put through the nip, and then a thin sheet was formed, folded in third, and reinserted into the nip of the calender. This process was repeated for 5 times with 90° rolling direction changes every time. Finally the uniform carbon composite thin sheet was ready with ~1 mm thickness.

Finally, the sheet was trimmed to form 4 cm×10 cm rectangle for use in the electrode assembly, and then put on the Ti mesh current collector. After pressing (8 MPa), the capacitor electrode was formed. The electrode with 3 g activated carbon loading was assembled as positive electrode used for supercapacitor desalination.

Example 3

Activated carbon (6 g, manufactured by Yuhuan activated carbon Co. Ltd., coconut shell type, average particle size of 15 microns, surface area of 2000 $m^2/g$), 2.1 g cation ionic exchange resin (Tianjin Nankai Resin Factory, Strongly acid cation exchanger 001×7, milled into ~50 μm particle size before use, water content 40%), and 20 g of water were added into a speedmixer. Mix at room temperature with 1000 rpm speed for 30 seconds.

To the upper mixture, total 0.8 g PTFE (T-60 emulsion, Dupont) was added. By each time, 0.2 g PTFE was dropped with mixing at 3500 rpm for 20 seconds until finish. The paste is put directly on the roller for calendering.

For roll calendering, a two-roll calender was used. The calender nip was set to 0.8 mm width, the mixed paste is put through the nip, and then the thin sheet was formed, folded in third, and reinserted into the nip of the calender. This process was repeated for 5 times with 90° rolling direction changes every time. Finally the uniform carbon composite thin sheet was ready with ~1 mm thickness.

Finally, the sheet was trimmed to form 4 cm×10 cm rectangle for use in the electrode assembly, then put on the Ti mesh current collector. After pressing (8 MPa), the capacitor electrode was formed. The electrode with 3 g activated carbon loading was assembled as negative electrode used for supercapacitor desalination.

The resulting negative electrode (40 cm$^2$ surface area) of example 3 and the positive electrode (40 cm$^2$ surface area) of example 2 were assembled together and 2 spacers (thickness: 1.5 mm) are put between the electrodes. The cell resistance was measured by calculating the voltage at the beginning of the charging state in 1560 ppm NaCl solution. And capacity was measured by scanning cyclic voltammetry in 1 mol/L NaCl solution. The cell resistance was 1.9+/−0.10 Ohm, 21% reduction comparing with that of example 1. And the specific capacity is 103+/−0.5 F/g, 37% increase comparing with that of example 1.

Example 4

Activated carbon (12 g, manufactured by Yuhuan activated carbon Co. Ltd., coconut shell type, average particle size of 15 microns, surface area of 2000 m$^2$/g) and 35 g of ethanol were added into a speedmixer. Mix at room temperature with 1000 rpm speed for 30 seconds.

Then 1.6 g PTFE (T-60 emulsion, Dupont) was dropped into the above mixture by three times. In detail, first 0.4 g PTFE was dropped into the mixture and mixed at 800 rpm for 1 minute; then 0.6 g PTFE was dropped into the mixture and mixed at 800 rpm for 1 minute; at last 0.6 g PTFE was dropped into the mixture and mixed at 800 rpm for 1 minute. The resulting paste is used for calendering.

For roll calendering, a two-roll calender was used. The calender nip was set to 0.8 mm width, the mixed paste is put through the nip, and then the thin sheet was formed, folded in third, and reinserted into the nip of the calender. This process was repeated for 5 times with 90° rolling direction changes every time. Finally the uniform carbon composite thin sheet was ready with ~1 mm thickness.

Finally, the sheet was trimmed to form 4 cm×10 cm rectangle for use in the electrode assembly, then put on the Ti mesh current collector. After pressing (8 MPa), the capacitor electrode was formed. The formed cell was used for supercapacitor desalination.

Comparative Example 1

Weigh 12 g of activated carbon (manufactured by Yuhuan activated carbon Co. Ltd., coconut shell type, average particle size of 15 microns, surface area of 2000 m$^2$/g), 38 g of water and 1.2 g PTFE. Mix all these materials together in a speedmixer at room temperature at 1000 rpm speed for 60 seconds.

The slurry is not easy for directly calendering on the roller due to much water in without water separating from the slurry. After standing 30 min, water can leach out to form a paste, which can be used for calendering. Or after filtering by filter paper to form a paste, the paste can be used for calendering on the roller.

Figure 3:
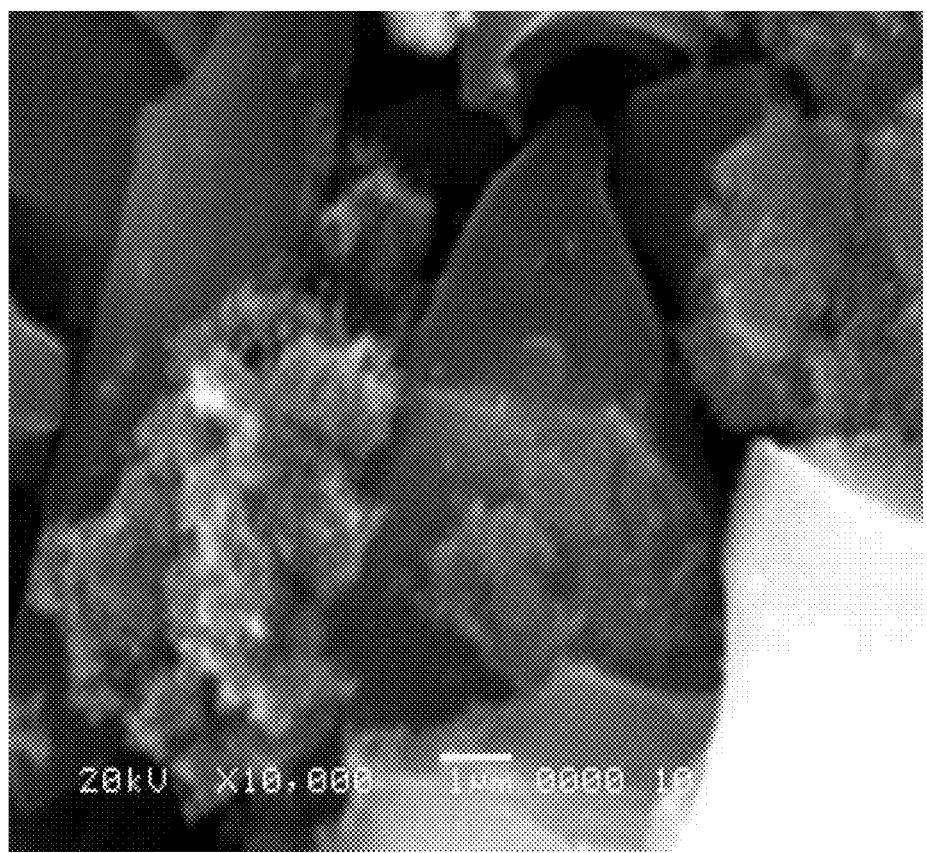
FIG. 3 is a scanning electron micrograph image of a composition prepared in comparative example 1.

FIG. 3 is the SEM image of the paste by this one-step method. From the image, no fiber was found, only some coagulated small particles and larger activated carbon particles. This confirmed that during the one-step mixing process, the fibrillation of PTFE is poor.

For roll calendering, a two-roll calender was used. The calender nip was set to 0.8 mm width and the mixed paste is put through the nip. After three times rolling, the paste can be changed into sheet. The sheet was folded in third, and reinserted into the nip of the calender. This process was repeated for 8 times with 90° rolling direction changes every time. Finally the uniform carbon composite thin sheet was ready with ~1 mm thickness.

The tensile strength of the resulting sheet by one step mixing method is 0.04 Mpa, much lower than that in example 1.

Figure 4:
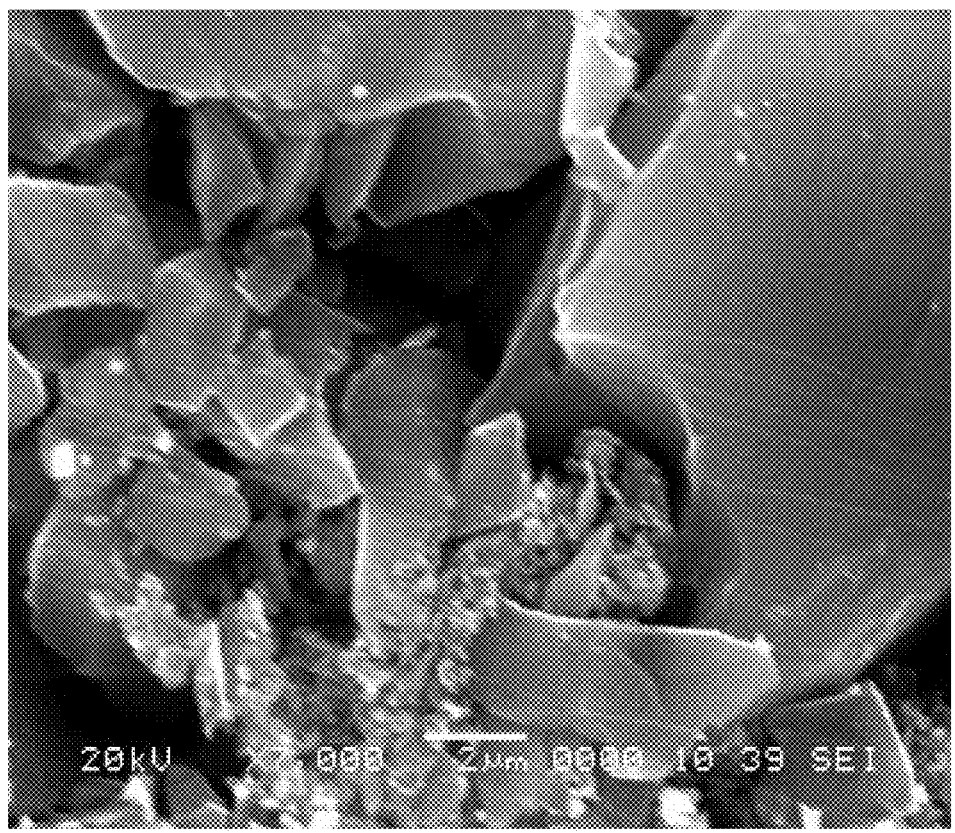
FIG. 4 is a scanning electron micrograph image of a sheet prepared in comparative example 1.

FIG. 4 shows the scanning electron micrograph picture of the carbon sheet prepared by this method. Comparing with image of FIG. 2, only few fibers near the carbon particles. These fibers were produced in the calendering process since there is no fiber found in the paste shown in SEM image (FIG. 3) before calendering.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming an electrode, comprising the steps of:
   (a) providing a mixture of carbon particles and water and shearing the mixture to form a dispersion of the carbon particles in the water;
   (b) adding non-fibrillated POLY(TETRAFLUOROETHYLENE) to the dispersion to provide a resultant mixture comprising 2-10% by dry weight of POLY(TETRAFLUOROETHYLENE), 0-30% by dry weight of a conducting material, and 60-98% by dry weight of carbon particles, wherein a ratio by weight between the water and a total of the POLY(TETRAFLUOROETHYLENE), the conducting material and the carbon particles in the resulting mixture is in a range of 3:2 to 4:1, and shearing the resultant mixture until at least a portion of the POLY(TETRAFLUOROETHYLENE) has been fibrillated;
   (c) processing the resultant mixture into a sheet; and
   (d) attaching the sheet to a current collector.

2. The method of claim 1, wherein the resultant mixture is processed into the sheet by calendering.

3. The method of claim 1, wherein each of steps (a) and (b) is operated at room temperature.

4. The method of claim 1, wherein each of steps (a) and (b) are collectively operated in 30 seconds to 10 minutes.

5. The method of claim 1, wherein a rate of shearing in each of steps (a) and (b) is 400-3500 rpm.

6. The method of claim 1, wherein the conducting material comprises a strongly acidic cation ion exchange resin.

7. The method of claim 1, wherein the conducting material comprises a strongly basic anion ion exchange resin.

8. The method of claim 1, wherein the conducting material comprises carbon black.

9. The method of claim 1, wherein the conducting material comprises graphite powder.

10. The method of claim 1, wherein the non-fibrillated POLY(TETRAFLUOROETHYLENE) is added portion-wise.

11. The method of claim 1 wherein the carbon particles comprise activated carbon particles.

* * * * *

UNITED STATES PATENT AND TRADEMARK OFFICE
CERTIFICATE OF CORRECTION

PATENT NO. : 8,904,626 B2  
APPLICATION NO. : 13/121293  
DATED : December 9, 2014  
INVENTOR(S) : Liu et al.

Page 1 of 1

It is certified that error appears in the above-identified patent and that said Letters Patent is hereby corrected as shown below:

In the specification

Column 3, Line 19, delete "PFTE" and insert -- PTFE --, therefor.

Signed and Sealed this
Fifth Day of April, 2016

Michelle K. Lee
*Director of the United States Patent and Trademark Office*